United States Patent
Monnet

(12) United States Patent (10) Patent No.: US 6,506,001 B2
(45) Date of Patent: Jan. 14, 2003

(54) RADIAL DRILLING DEVICE FOR A LATHE

(76) Inventor: Thierry Monnet, 65, rue Saint Hippolyte, 74950 Scionzier (FR)

(*) Notice: Subject to any disclaimer, the term of this patent is extended or adjusted under 35 U.S.C. 154(b) by 35 days.

(21) Appl. No.: 09/782,746

(22) Filed: Feb. 13, 2001

(65) Prior Publication Data

US 2001/0014260 A1 Aug. 16, 2001

(30) Foreign Application Priority Data

Feb. 14, 2000 (FR) .............................................. 00 01776

(51) Int. Cl.[7] .............................................. B23B 35/00
(52) U.S. Cl. ................... 408/1 R; 82/131; 29/26 A; 29/27 C; 408/32; 408/41; 408/55; 408/129
(58) Field of Search ...................... 82/1.11, 131, 171; 408/1 R, 32, 33, 34, 55, 37, 42, 52, 124, 129; 29/26 A, 27 C

(56) References Cited

U.S. PATENT DOCUMENTS

| | | | | |
|---|---|---|---|---|
| 497,434 A | * | 5/1893 | Sherman | 408/32 |
| 2,913,933 A | * | 11/1959 | Bosse | 408/10 |
| 3,746,459 A | * | 7/1973 | Kindelan | 408/37 |
| 3,895,559 A | * | 7/1975 | Hoffman | 408/129 |
| 3,910,713 A | * | 10/1975 | Maroschak | 29/33 D |
| 3,957,386 A | | 5/1976 | Lupke | 408/50 |
| 4,219,293 A | * | 8/1980 | Licht | 408/1 R |
| 4,881,309 A | * | 11/1989 | Sansone | 29/26 A |
| 5,662,524 A | | 9/1997 | Esser et al. | 470/190 |
| 5,964,016 A | * | 10/1999 | Ito et al. | 279/14 |
| 6,257,111 B1 | * | 7/2001 | Shinohara et al. | 29/26 A |

FOREIGN PATENT DOCUMENTS

| | | |
|---|---|---|
| DE | 19 13 377 A | 9/1970 |
| DE | 195 34 167 C | 11/1996 |
| EP | 0 240 946 A | 10/1987 |
| FR | 1 578 566 A | 8/1969 |

* cited by examiner

*Primary Examiner*—Daniel W. Howell
(74) *Attorney, Agent, or Firm*—Fay, Sharpe, Fagan, Minnich & McKee, LLP

(57) ABSTRACT

A radial drilling device (1) for a lathe (5) for radially piercing a turning part (4) supported by the lathe. At least one drill bit (2b) is supported by a mobile drilling jaw (3a, 3b) in a transverse orthogonal plane to the axis of rotation of the part (4) to be drilled. A principal revolving drilling set (ERP) carries the drilling assembly and causes the drilling assembly to rotate around the longitudinal axis of revolution of the part (4), at the same rotational speed as that of the part (4) which is to be drilled.

15 Claims, 2 Drawing Sheets

RADIAL DRILLING DEVICE FOR A LATHE

BACKGROUND OF THE INVENTION

The present invention concerns a drilling device intended to equip lathes in order to permit drilling of radial holes in a part.

In the metal shaping field, a great number of parts which are machined with the aid of lathes require the drilling of a transverse hole along one of its diameters.

The drilling is performed with a drill bit arranged radially on the lathe and designed to pierce the abutting part along its diameter. Drilling the holes, however, presents many drawbacks, especially the drawback of requiring the part to be drilled remaining stationary in order to permit the drilling. In addition, it requires the utilization of a tool which approaches radially on the side of the part. However, the space located laterally around the part, with the majority of the machine tools and notably lathes, is generally obstructed by equipment, for example oil inlets or sensors.

Consequently, the radial piercing tools currently utilized on lathes are not completely satisfactory, inasmuch as they somewhat lengthen the machining operations and, thus, slow down production and output of the machine tools at the production facility.

It is the object of the present invention to resolve the above mentioned drawbacks with the aid of simple, reliable and readily implementable means. Its aim is to facilitate the radial drilling operations which are performed on lathes and to accelerate said drillings by augmenting the lathe output.

SUMMARY OF THE INVENTION

According to its principal characteristic, the radial drilling device for a lathe according to the invention is for drilling a hole or holes radially in a rotating part supported by the lathe. It comprises drilling means formed by at least one drill bit, held by a mobile drilling jaw in a transverse plane, orthogonal to the rotational axis of the part to be drilled. It is characterized in that it comprises a principal rotational drilling set which carries the drilling means and causes the drilling means to rotate around a longitudinal axis of rotation of the part at the same rotational speed as the speed of the part to be drilled, initiated by the lathe.

According to another characteristic of the radial drilling device for a lathe according to the invention, it is characterized in that the principal rotational drilling set is mounted on a counter-spindle of the lathe and is formed by two integral sub-assemblies rotating around the longitudinal axis of the device in order to undergo synchronized rotation with that of the part to be drilled. An auxiliary sub-assembly and a drilling sub-assembly whose movement relative to the auxiliary sub-assembly controls the radial movement of the drilling jaw or drilling jaws.

According to a complementary characteristic of the radial drilling device for a lathe according to the invention, it is characterized in that it is installed on the lathe in the extension of the part to be drilled, in order to be longitudinally displaced according to the rotational axis of the part, said displacement initiating the relative movement of the auxiliary and drilling sub-assemblies.

According to the preferred specific embodiment of the radial drilling device for a lathe according to the invention, the principal rotational set comprises a drilling sub-assembly which radially supports the drill bits by the obliquity of the mobile drilling jaws and an auxiliary sub-assembly whose relative movement in translation according to the longitudinal axis of the device relative to the drilling sub-assembly causes the radial displacement of drilling jaws by virtue of a system of complementary slopes and support surfaces.

According to this embodiment, the drilling sub-assembly comprises a principal control element that is put into motion by the part to be drilled in relation to the support sub-assembly, at the time of the longitudinal displacement between the device and the part in order to carry along in longitudinal translation the drilling jaw or drilling jaws which present the complementary slopes that cooperate with the support surfaces of a support element of the support sub-assembly.

In addition, the radial drilling device for a lathe comprises a driving assembly that causes the drill bit or drill bits to rotate around their own axis.

According to a complementary characteristic of the radial drilling device for a lathe according to the invention, it is characterized in that the drill bit or drill bits is/are mounted freely rotating in the drilling jaw or jaws and carry pinions that engage a drive ring of the immobile drive set in rotation when the jaws carried by the rotational set cause a rotation around the longitudinal axis of the device.

According to the preferred specific embodiment of the radial drilling device for a lathe according to the invention, the pinions of the drill bits and the driving ring cooperate by enmeshment regardless of the radial position of the drilling jaws that carry the drill bits.

According to another characteristic of the radial drilling device for a lathe according to the invention, it is characterized in that the driving ring is mounted on a stationary, rotatable element in rotation around the longitudinal axis, but integral in longitudinal displacement of the drilling sub-assembly in order to keep the pinions and the driving ring in cooperation.

According to the preferred specific embodiment of the radial drilling device for a lathe according to the invention, it is characterized in that it comprises two diametrically opposed drill bits, carried by two drilling jaws.

BRIEF DESCRIPTION OF THE DRAWINGS

Other characteristics and benefits of the invention are apparent from the description below relative to the attached drawings, which are provided by way of examples only and are not limited thereto.

FIG. 1 is a perspective view of the rear three quarters of the radial drilling device;

FIG. 2 is a perspective view of the front three quarters of the drilling device contacting the part to be drilled;

FIG. 3 is a longitudinal section representation of the radial drilling device.

DETAILED DESCRIPTION OF THE PREFERRED EMBODIMENT

Figure 1:
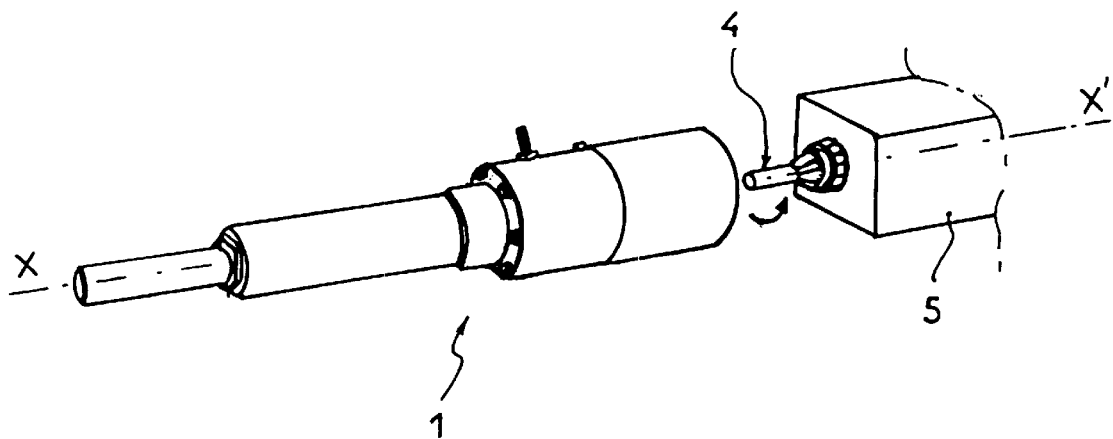
FIGS. 1 to 3 illustrate in perspective the radial drilling device according to the invention.

According to the preferred embodiment invention, with reference to FIG. 1, a radial drilling device 1 is mounted on a lathe 5 in order to drill holes radially in a part 4 carried by the lathe.

It comprises drilling means MP formed by at least one drill bit 2a, 2b carried by a drilling jaw 3a, 3b mobile in a transverse plane T, orthogonal to an axis of revolution XX' of the part to be drilled 4. According to the preferred embodiment, the drilling means MP of the radial drilling device 1 are caused to rotate around the axis of revolution XX' of the part 4 at the same rotational speed as that of the part 4 initiated by the lathe 5. In order to accomplish this, the radial drilling device comprises a principal rotational drilling set ERP which comprises the drilling means MP and which is synchronized in rotation with the part to be drilled 4. Said rotational set ERP rotates freely in a fixed external feeding set EE. The rotational set ERP is thus joined with a counter spindle of the lathe 5 in order to undergo identical rotation as the rotation of the part 4.

According to the preferred specific embodiment of the illustrated drilling device 1, it comprises two drill bits 2a, 2b, mounted freely rotating in relationship to the drilling jaws 3a, 3b that carry them around their respective axes YY' with the assistance of bearings 6.

The drill bits are arranged, for example, to be diametrically opposed, and their mirror image movement is obtained by virtue of the rotational drilling set ERP which controls, on one hand, the synchronized rotation of the drilling jaws with the part to be drilled 4, and, on the other hand, the clamping and spacing of the jaws 3a, 3b. It should be noted that the rotation of the drill bits 2a, 2b around their axis YY' is generated by the external driving set EE, described later.

Figure 2:
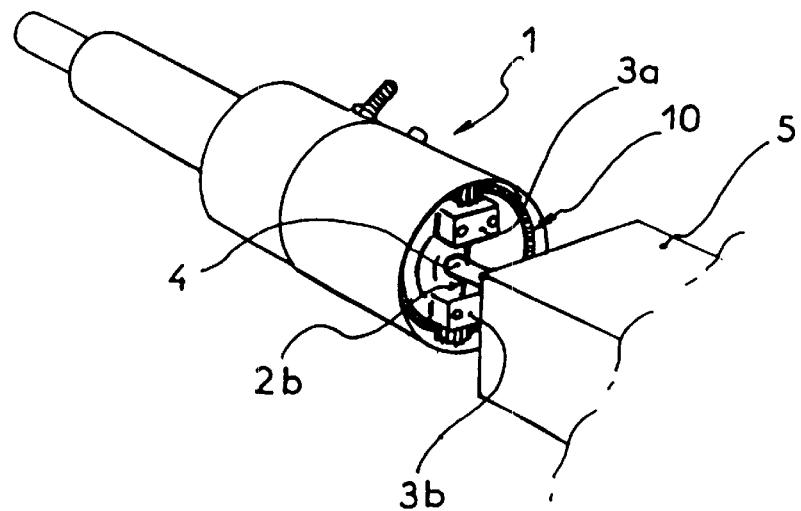

Thus, as indicated by FIGS. 1 and 2, the drilling device 1 bores radial holes in a revolving part 4 and is preferably utilized in conjunction with lathes 5. Due to the specific configuration of its drilling means, the drilling device 1 comes into contact with the part to be drilled 4 along the axis of revolution XX' of the part and it then positions itself in the extension of the part in such manner so as to cause its axis of revolution ZZ' to coincide with that of the part (XX'), in contrast to the classic lathe fittings which are going to machine radially and which thus occupy the space located transversely around the part 4. According to the preferred embodiment, the relative movement of the part to be drilled 4 and the radial drilling device 1 in order to achieve the drilling is a longitudinal translation movement along the axis of revolution XX' of the part 4.

Figure 3:
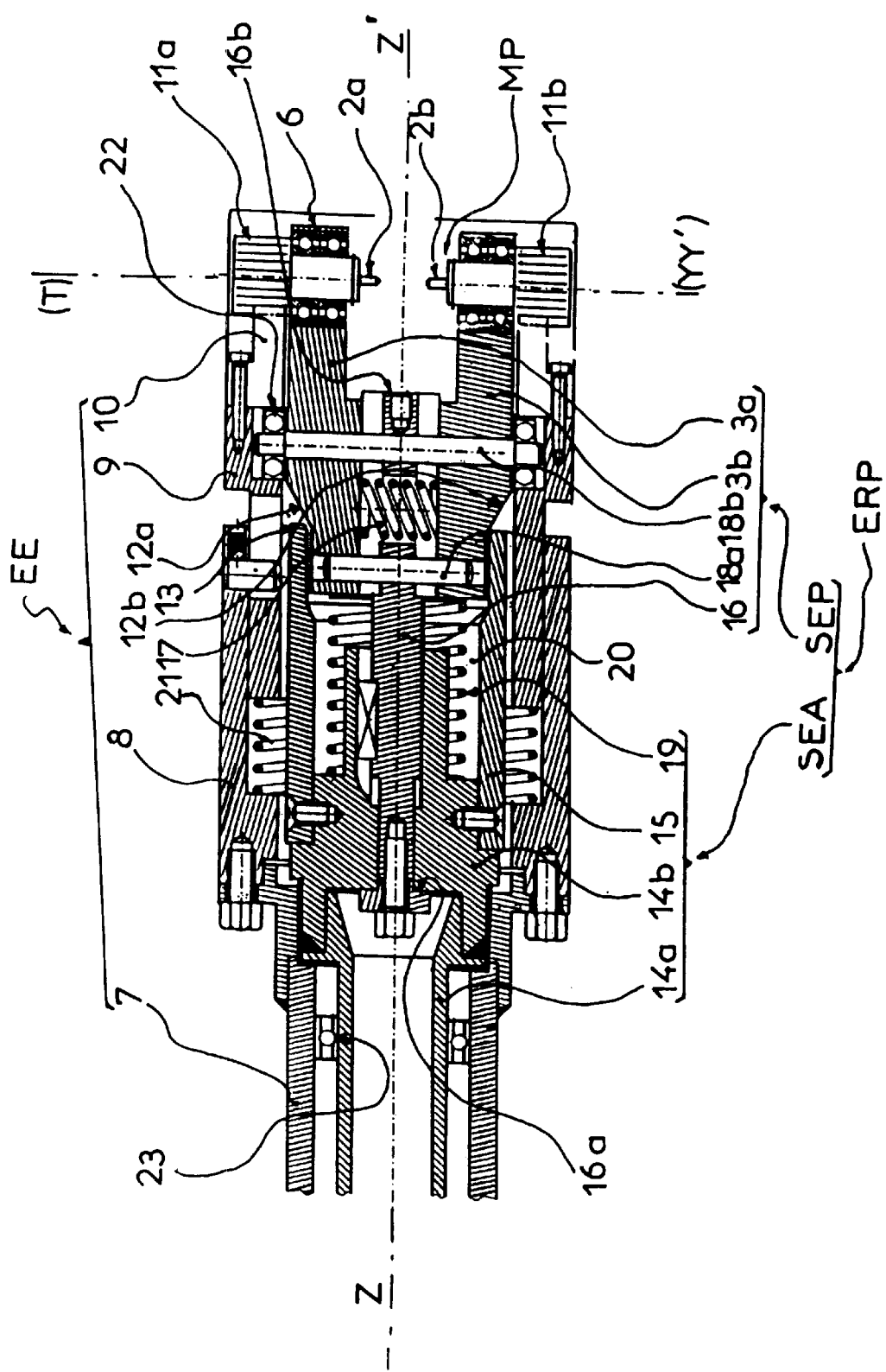

According to the embodiment illustrated in FIGS. 1 to 3, the principal rotatory set ERP comprises an auxiliary sub-set SEA and a drilling sub-set SEP, these two sub-sets translate against each other along the longitudinal axis of revolution ZZ' of the radial drilling device 1. The relative movement between these two sub-sets provokes the radial movement of the drilling jaws 3a, 3b due to a system of slopes 12a, 12b and a support surface 13 which cooperate with each other. It should be noted that said relative movement between the two sub-sets is obtained by movement between the drilling device 1 and the part to be drilled 4.

The auxiliary sub-set SEA comprises a complementary support element 15 and an entry shaft 14 formed by a principal shaft 14a and a guide socket 14b on which the complementary support element 15 is mounted. The drilling sub-set SEP comprises the drilling jaws 3a, 3b which are mounted on a principal control element 16 for sliding within a bore of the guide socket 14b, said sliding causing the cooperation between the slopes 12a, 12b located on the jaws 3a, 3b and the support surfaces 13a, 13b located on the complementary support element 15 thus involving the radial movement of the jaws. It should be noted that said cooperation between the slopes of the jaws and the support surfaces takes place against elastic return means, such as a spring 17 arranged cross-wise between the jaws 3a, 3b, in order to impinge upon the jaws in the gap.

According to the illustrated embodiment of the invention-specific radial drilling device 1 the principal control element 16 carries two radial guide rods 18a, 18b, that, on one hand, advance the jaws 3a, 3b in longitudinal translation and, on the other hand, guide their radial movement relative to each other. The principal control element 16 is disposed alongside the axis of revolution ZZ' of the device and includes a rear stop surface 16a at its rear extremity, that comes to rest against a complementary surface of the entry shaft 14a, 14b when the control element 16 is in an operative position. It includes at its other extremity a support surface 16b that cooperates longitudinally with the part to be drilled 4 in order to cause the respective movement between the auxiliary sub-set SEA and the drilling sub-set SEP when the drilling device 1 and the part to be drilled 4 experience their respective displacements. This longitudinal movement of the control element 16 occurs against the elastic return means which in the preferred embodiment includes a spring 19 which impinges on the device in operative position, said spring 19 being arranged longitudinally between the drilling jaws 3a, 3b and the support and guide socket 14b.

One will note that the complementary support element 15 comprises a cylindrical body, fixed at one end near the socket 14b and including its support surface 13 at the other end, while its bore forms a housing 20 in which the return spring 19 is arranged. The principal rotatory drilling set ERP, formed by the drilling and support sub-sets SEP, SEA as previously described is disposed at the interior of the successive bores of driving elements 7, 8, 9, 10 which form the external driving set EE, that sets the drill bits 2a, 2b carried by the jaws in rotation.

According to the preferred embodiment, the radial drilling device 1 comprises a principal rotatory set ERP that controls the synchronized rotation of the jaws 3a, 3b with the part to be drilled 4 and the radial movement of the drill bits 2a, 2b by the obliquity of the jaws 3a, 3b which support them and the driving set EE that causes the drill bits 2a, 2b to rotate by themselves. The driving set EE is fixed and comprises a principal shaft 7 forming an integral part of a complementary shaft 8, the complementary shaft being connected with a mobile driving element 9, which carries at its extremity a driving ring 10. The driving ring 10 cooperates by engaging with toothed wheels or pinions 11a, 11b integral with or supported by the drill bits 2a, 2b. As a result, when the rotatory set is made to rotate in relation to the external driving set EE, the counter-spindle of the lathe 5 causes the jaws 3a, 3b, the drill bits 2a, 2b and their respective pinions 11a, 11b to rotate around the axis of revolution ZZ' of the device and the drill bits then experience their own rotation around their own respective axis of revolution YY' due to pinions which traverse the ring 10 with which they cooperate by gear-engagement.

According to the illustrated embodiment of the invention-specific radial drilling device 1 the driving ring 10 which cooperates with the toothed wheels or pinions 11a, 11b of the drill bits 2a, 2b is mobile in longitudinal translation in order to be able to follow the translational movement of the drilling sub-set SEP of the part 4 and of the drill bits 2a, 2b so that the toothed wheels of the drill bits and the ring 10 remain in contact. In order to accomplish this, the ring 10 is fixed on the mobile driving element 9 integral in rotation with the complementary shaft 8, but susceptible to longitudinal translation when coming into contact with the elastic return means, such as a spring 21. Said translation, identical to the general translation of the drilling sub-set SEP, of the part 4 and the drill bits 2a, 2b, is controlled by means of connection arranged at the extremity of the radial guide rod 18b carried by the principal control element 16.

According to the preferred embodiment, these means of connection comprise bearings 22 for permitting the longitudinal impingement of the mobile element 9 and its ring 10 while permitting the guide rod 18b, the principal control element 16, and the other elements of the rotatory drilling set ERP to experience the rotatory driving movement, initiated by the counter spindle of the lathe at the interior of the elements 7, 8, 9, 10 which form the external driving set EE. It should be noted that this rotatory movement is facilitated also by complementary bearings 23 arranged between the fixed principal driving shaft 7 and the entry shaft 14 of the rotary set. It should also be noted that the interaction of the drill bits and the driving ring 10 is executed, regardless of the radial position of the drill bits, by virtue of their respective dimensions. It should be noted that the pinions present a denticulation width which is greater than the denticulation width of the ring, the difference between these two widths being greater than the a radial displacement of the jaws, so that the pinions are permanently in gear with the ring 10.

Thus, the radial drilling device 1 is positioned in the axis of the part that is to be drilled 4 because their respective axes of revolution ZZ', XX' are joined.

When drilling is intended, the device 1 and the part 4 are set in relative movement towards each other, in longitudinal translation along their axes XX', ZZ' while the principal rotatory drilling set ERP of the device and the part 4 are in synchronized rotation, causing the self-rotation of drill bits 2a, 2b, specifically, due to the external driving set EE. When the part 4 contacts the surface 16b of the principal control element 16, it advances the drilling sub-set SEP such that it causes interaction with the support sub-set SEA and it likewise moves in the translation the driving ring 10 and the mobile driving organ 9. The relative displacement of the two sub-sets causes the closure of the jaws 3a, 3b and thus the radial drilling of holes by the drill bits 2a, 2b, said drilling taking place during the rotation of the part 4.

According to non-represented variations of embodiment, the drilling device 1 can comprise a single drill bit or more than two drill bits, said drill bits can occupy different angular positions according to the parts to be machined. Moreover, it should be noted that the employed drill bits can easily be changed with a rapid installation system which permits modification of the utilized drill bit dimensions (diameter, length). One likewise notes that the surface of the stop 16b of the control element 16 can be adjusted longitudinally or is interchangeable thanks to a detachable fixation system in order to permit adjustment of the desired drilling length on the part 4. It is, of course, self-understood that one can likewise provide adjustment on the slopes and the support surfaces in order to choose the drilling depth and the speed of the radial movement of the drill bits without going outside the protected field of the invention.

It is understood that the invention is not limited to the embodiments which are described or represented by way of examples, but includes, as well, all equivalent techniques and also their combinations so long as they come within the scope of the appended claims or the equivalents thereof.

Having thus described the preferred embodiments, the invention is now claimed to be:

1. A radial drilling apparatus for drilling a radial bore in a part rotating in a lathe, the drilling apparatus comprising:
    a principal rotatory drilling set which carries a drilling means and which rotates the drilling means around an axis of revolution of a part to be drilled at a common rotational speed with the part to be drilled, the drilling means including at least one drill bit carried by a drilling jaw to move in a transverse plane orthogonal to the axis of revolution of the part to be drilled.

2. The radial drilling apparatus according to claim 1, wherein the principal rotatory drilling set is mounted on a counter-spindle of the lathe, which principal rotatory drilling set includes:
    a support sub-assembly and
    a drilling sub-assembly whose relative movement in relation to the support sub-assembly controls the radial movement of the at least one drill bit, the support and drilling sub-assembly rotating around a longitudinal axis of the apparatus synchronously with the rotation of the part to be drilled.

3. The radial drilling apparatus according to claim 2 wherein the apparatus is mounted on the lathe in an extension of the part to be drilled in order to be longitudinally displaced along the axis of revolution of the part, said displacement causing the relative movement in between the support and drilling sub-assemblies.

4. The radial drilling apparatus according to claim 2 wherein the drilling sub-assembly carries the drill bits by the obliquity of the radially mobile drilling jaw and further including a system of cooperating slopes and support surfaces between the drilling and support sub-assembly such that the relative movement of the support sub-assembly in longitudinal translation along the longitudinal axis of the device in relation to the drilling sub-assembly causes the radial displacement of the drilling jaw.

5. The radial drilling apparatus according to claim 4 wherein the drilling sub-assembly comprises:
    a principal control element which carries the support surfaces and is set in motion by the part to be drilled relative to the support sub-assembly by longitudinal displacement between the apparatus and the part to be drilled, such that with longitudinal translation the drill jaw, the drill jaw cooperating slopes cooperate with the support surfaces.

6. The radial drilling apparatus according to claim 1, further comprising:
    a driving assembly which sets the at least one drill bit into rotating movement around their own axis.

7. The radial drilling apparatus according to claim 6 wherein the at least one drill bit is mounted free in rotation in the drill jaw, pinions cooperate with a driving ring of the driving set to rotate when the jaw carried by the rotatory assembly to effect rotation around the axis of rotation of the part to be drilled.

8. The radial drilling apparatus according to claim 7 wherein the pinions of the at least one drill bit and the driving ring cooperate by gear-engagement regardless of the radial position of the drilling jaw carrying the drill bits.

9. The radial drilling apparatus according to claim 7 wherein the driving ring is mounted on a mobile driving element which is immobile in rotation around the axis of the part to be drilled and moves with longitudinal displacement of the drilling sub-assembly in order to keep the pinions and the driving ring in cooperation.

10. The radial drilling apparatus according to claim 1, further including:
    two diametrically opposed drill bits, carried by two drilling jaws.

11. A method of drilling comprising:
    rotating a machinable part on a lathe at a first rotational speed;
    rotating at least one drill bit around the machinable member of the first rotational speed;
    boring a hole with the at least one drill bit into the machinable part while both the machinable part and the at least one drill bit are rotating at the first rotational speed.

12. The method according to claim 11, further including:

moving the part and jaws carrying the drill bit towards each other;

engaging the jaw with the part urging the jaw to close bringing the at least one drill bit into contact with the machinable part.

13. A drilling apparatus for use in conjunction with a lathe, the apparatus comprising:

at least one drill bit for boring a hole in a machinable member;

at least one jaw for securing the at least one drill bit, the at least one jaw being rotatable about an axis of symmetry;

a plurality of plates oblique to the axis of symmetry, which plates cam the at least one jaw more proximal to the axis of symmetry when the at least one jaw is translated along the axis of symmetry.

14. The drilling apparatus according to claim 13 further including:

a stop plate upon which the machinable member impinges to translate the at least one jaw along the axis of symmetry.

15. The drilling apparatus according to claim 13, further including:

a counter-spindle upon which a principal rotary drilling assembly is mounted, the counter-spindle causing the at least one jaw to rotate at a rotational speed equal to a rotational speed of the lathe.

\* \* \* \* \*